(12) United States Patent
Dobschal et al.

(10) Patent No.: US 9,470,896 B2
(45) Date of Patent: Oct. 18, 2016

(54) DISPLAY DEVICE

(71) Applicant: Carl Zeiss Smart Optics GmbH, Aalen (DE)

(72) Inventors: Hans-Juergen Dobschal, Kleinromstedt (DE); Karsten Lindig, Erfurt (DE)

(73) Assignee: Carl Zeiss Smart Optics GmbH, Aalen (DE)

( * ) Notice: Subject to any disclaimer, the term of this patent is extended or adjusted under 35 U.S.C. 154(b) by 0 days.

(21) Appl. No.: 14/419,219

(22) PCT Filed: Jul. 31, 2013

(86) PCT No.: PCT/EP2013/066103
§ 371 (c)(1),
(2) Date: Feb. 2, 2015

(87) PCT Pub. No.: WO2014/020073
PCT Pub. Date: Feb. 6, 2014

(65) Prior Publication Data
US 2015/0205138 A1    Jul. 23, 2015

(30) Foreign Application Priority Data

Aug. 2, 2012  (DE) .................. 10 2012 213 685

(51) Int. Cl.
G02B 5/18 (2006.01)
G02B 27/10 (2006.01)
(Continued)

(52) U.S. Cl.
CPC ......... G02B 27/1086 (2013.01); G02B 5/1842 (2013.01); G02B 5/1861 (2013.01);
(Continued)

(58) Field of Classification Search
CPC .............. G02B 27/01; G02B 27/0172; G02B 27/1086; G02B 27/14; G02B 5/00; G02B 5/1842; G02B 5/1861; G02B 6/0011; G02B 2027/0125; G02B 2027/0178; G02B 2027/0118; G02B 27/017; G02B 27/0081; G02B 5/18; G02B 6/0016; G02B 27/0944; G02B 6/34; G02B 27/4205; G02B 27/4272

USPC .................................... 359/630–633
See application file for complete search history.

(56) References Cited

U.S. PATENT DOCUMENTS 4,711,512 A    12/1987  Upatnieks
6,224,222 B1    5/2001  Inoguchi et al.
(Continued)

FOREIGN PATENT DOCUMENTS

DE    102010041348 A1    3/2012
EP       2246728 A1    3/2010
(Continued)

OTHER PUBLICATIONS

International Preliminary Report on Patentability for PCT/EP2013/066103, dated Feb. 3, 2015, 16 pages (including English translation).

*Primary Examiner* — Euncha Cherry
(74) *Attorney, Agent, or Firm* — Skaar Ulbrich Macari, P.A.

(57) ABSTRACT

Disclosed is an image generator with several pixels, from which light bundles are emitted for generating an image, a control unit for controlling the image generator and an imaging optical system which comprises a light guiding element with a front side and a rear side, which light guiding element has an input grating formed on the front or rear side and an output grating formed on the front or rear side. The light bundles are input into the light guiding element by means of diffraction at the input grating, guided in the light guiding element by means of total internal reflection up to the output grating and output by means of diffraction at the output grating such that a user can perceive the generated image.

16 Claims, 4 Drawing Sheets

(51) Int. Cl.
*F21V 8/00* (2006.01)
*G02B 27/01* (2006.01)

(52) U.S. Cl.
CPC ......... *G02B27/0172* (2013.01); *G02B 6/0011* (2013.01); *G02B 2027/0125* (2013.01); *G02B 2027/0178* (2013.01)

(56) References Cited

U.S. PATENT DOCUMENTS

| | | |
|---|---|---|
| 2005/0207012 A1 | 9/2005 | Arnold et al. |
| 2006/0126181 A1 | 6/2006 | Levola |
| 2009/0040580 A1* | 2/2009 | Mukawa ................. G02B 5/32 359/15 |
| 2009/0245730 A1 | 10/2009 | Kleemann |
| 2010/0177388 A1 | 7/2010 | Cohen et al. |
| 2010/0220295 A1 | 9/2010 | Mukawa et al. |
| 2013/0215516 A1* | 8/2013 | Dobschal ........... G02B 27/0101 359/630 |
| 2013/0222384 A1 | 8/2013 | Futterer |

FOREIGN PATENT DOCUMENTS

| | | |
|---|---|---|
| WO | 2011089433 A1 | 7/2011 |
| WO | 2012062681 A1 | 3/2012 |

\* cited by examiner

DISPLAY DEVICE

PRIORITY

This application claims the benefit of German Patent Application No. 102012213685.1, filed on Aug. 2, 2012, which is hereby incorporated herein by reference in its entirety.

FIELD

The present invention relates to a display device with an image generator.

BACKGROUND

Conventional display devices are known e.g. from US 2010/0220295 A1, wherein the light guiding element is formed as a plane-parallel plate, with the result that both the front side and the rear side are in each case a planar surface. In this case, it is relatively easy to generate a large eyebox (the region of the imaging optical system in which the eye of the user can move wherein the user can always still perceive the output image). This is achieved by carrying out a sequential multiple outputting via the output grating which is not imaging.

However, if the light guiding element has a curved front side and/or a curved rear side, the difficulty arises that the light bundles guided between the two gratings in total reflection are influenced by the curved front side and/or the curved rear side, with the result that, after each reflection, there is a different state of the wave propagating on the basis of the light bundle.

SUMMARY

The present invention in certain embodiments relates to an image generator with several pixels, from which light bundles are emitted for generating an image, a control unit for controlling the image generator and an imaging optical system which comprises a light guiding element with a front side and a rear side, which light guiding element has an input grating formed on the front or rear side and an output grating formed on the front or rear side. The light bundles are input into the light guiding element by means of diffraction at the input grating, guided in the light guiding element by means of total internal reflection up to the output grating and output by means of diffraction at the output grating such that a user can perceive the generated image.

An object of certain embodiments of the invention includes providing a display device wherein, in a light guiding element with a curved front side and/or a curved rear side, a large eyebox of the imaging optical system with, at the same time, a sufficiently large field of view can be realized.

In certain disclosed embodiments, a display device is provided wherein the front side and/or the rear side of the light guiding element is/are formed curved and the imaging optical system is designed such that the light bundles strike the output grating at most n times depending on the position of the associated pixel, wherein n is an integer greater than or equal to 3, and that the light bundles are output depending on the position of the associated pixel at 1 to m successive strikes on the output grating, wherein m is an integer greater than or equal to 1 and is smaller than n and the outputting begins, at the latest, at the $(n-m+1)^{th}$ strike.

Because of this outputting of the light bundles depending on the position of the associated pixel, the output grating can be adapted to the striking light bundles such that the desired eyebox can be realized with, at the same time, the predefined field of view. As the light bundles strike in each case at different places during their successive striking on the output grating, the corresponding adaptation of the output grating necessary for this is easily possible.

If only the front side or only the rear side is formed curved, the other of the two sides can be planar. Preferably however, both front side and rear side are formed curved.

The input and/or output grating(s) can be formed as an imaging grating. Furthermore, it is thus possible to compensate for imaging errors, which occur in particular because the light bundles strike the output grating at a very shallow angle (because of the guiding by total reflection in the light guiding element). These imaging errors are in particular astigmatism and coma.

The input and/or output grating(s) can be formed as a reflective grating, in particular as a reflective volume grating or reflective hologram.

The input and/or output grating(s) can be formed on the front side of the light guiding element. The front side is the side which points away from the eye of the user during normal use.

The output grating can be designed such that its diffraction efficiency for a light bundle increases from the first to the $m^{th}$ output. It is thus possible to achieve as homogeneous as possible an intensity in the image that can be perceived by the observer.

In addition, a graduated filter can be arranged between the light guiding element and the image generator. In addition or as an alternative, the image generator can have a location-dependent variation of the emitted light intensity. Again, as homogeneous as possible an intensity can thus be achieved in the image that can be perceived by the user.

In particular, several outputs of a light bundle in an eyebox of the imaging optical system can partially overlap each other.

In addition, the input and output gratings can in each case be a superimposition of several individual gratings which are designed for different center frequencies, wherein the centre frequencies of the individual gratings for the input and output gratings in each case coincide in pairs. Thus, an excellent imaging of white light is also possible.

The display device can furthermore include a holder which can be fitted on the head of the user and to which the image generator and the light guiding element are attached. The holder can in particular be formed like a pair of spectacles.

The light guiding element can be made of glass or plastic and/or formed as a spectacle lens.

The light guiding element and the output grating can be formed such that the user can perceive the generated image superimposed with the surroundings.

The display device according to the invention can also be referred to as a beam expander on a curved light guiding element.

It is understood that the features mentioned above and those yet to be explained below can be used not only in the stated combinations but also in other combinations or alone, without departing from the scope of the present invention.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention.

Figure 1:
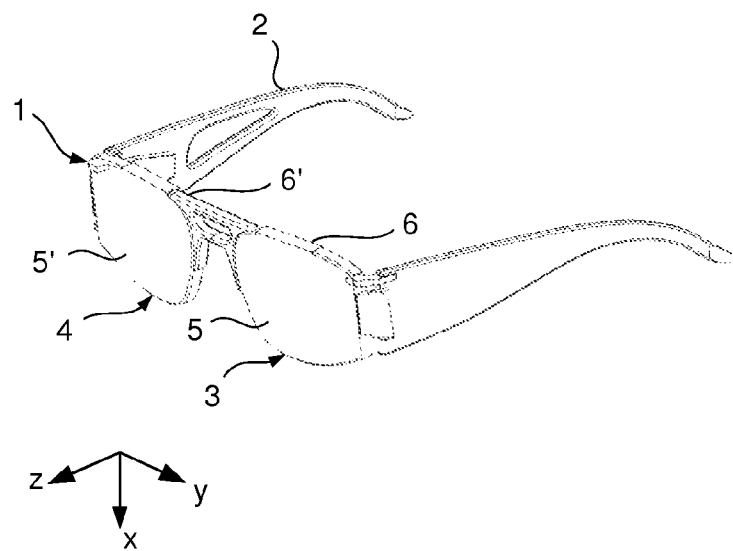
FIG. 1 is a schematic perspective representation of an embodiment of the display device according to certain embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 comprises a holder 2 which can be fitted on the head of a user and which can e.g. be formed in the manner of a conventional spectacles frame, as well as a first and a second light guiding element 3, 4 in the form of a first and a second spectacle lens, which are attached to the holder 2. The two spectacle lenses 3, 4 in each case have a curved front side 5, 5' and a curved rear side 6, 6'.

Figure 2:
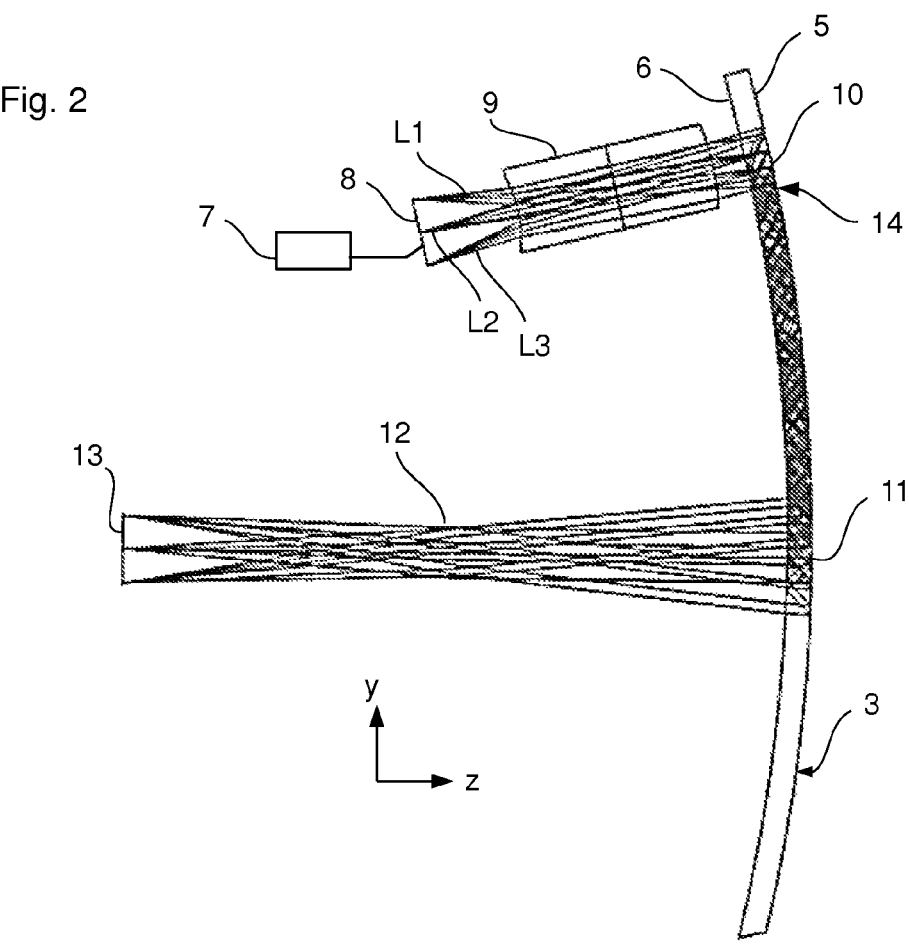
FIG. 2 is an enlarged top view of a part of the display device according to FIG. 1.

In FIG. 2, the first spectacle lens 3 is shown in conjunction with further parts of the display device 1 according to the invention in a schematic top view. The spectacle lens has a thickness of 1.5 mm, wherein the radius of curvature of front side and rear side 5, 6 is in each case 100 mm. PMMA (Zeomex) is used as material for the spectacle lens 3. The display device 1 furthermore comprises a control unit 7, an image generator 8 (which is here formed for example as an OLED module) as well as an additional optical system 9 arranged between the image generator 8 and the first spectacle lens 3. The additional optical system 9 is optionally provided.

On the front side 5 of the first spectacle lens 3, spaced apart from each other, an input grating 10 and an output grating 11 are in each case formed as a reflective hologram, the function of which is explained in detail below. Furthermore, in FIG. 2, the pupil 12 and the retina 13 of an eye of a user wearing the display device 1 according to the invention are drawn in schematically. In addition, the beam path of three light bundles L1, L2 and L3 from the image generator 1 to the retina 13 is drawn in schematically.

The light bundles L1-L3 emitted by the image generator 8 (each light bundle L1-L3 starts from one of several pixels of the image generator 8) are directed from the additional optical system 9 onto the rear side 6 of the first spectacle lens 3, enter the spectacle lens 3 via the rear side 6 and strike the input grating 10. At the input grating 10, the beams are reflected and diffracted such that they strike the rear side 6 at such an angle at which total internal reflection occurs. The light bundles L1-L3 are thus guided by means of total internal reflection at the rear and front side 6, 5 up to the output grating 11, which then effects an outputting of the light bundles L1-L3 via the rear side 6 such that a user can perceive an image generated by the image generator 8 as a virtual image. The additional optical system 9 in conjunction with the first spectacle lens 3 and the input and output gratings 10, 11 thus form an imaging optical system 14 which images the image generated by means of the image generator 8 as a virtual image for the user. In order that the user can perceive this virtual image, the pupil 12 of the eye of the user must lie in the exit pupil of the imaging optical system 14. As, for example, the eye distance varies from observer to observer, it is advantageous if the exit pupil of the imaging optical system 14 in the y-direction is larger than the pupil of the eye 12. In this case, the display device 1 according to the invention can be used by different users with different eye distances.

In order that the exit pupil of the imaging optical system 14 in the y-direction or the eyebox of the imaging optical system 14 (the region in which the eye of the user can move and the user can always perceive the output image) in the y-direction is larger than the pupil of the eye and, at the same time, there is a large field of view in the y-direction, the output grating 11 is formed such that, at the first strike on the output grating 11, it only outputs a part of the light bundles L1-L3 depending on the position of the corresponding pixel of the image generator 8. The outputting takes place over the first diffraction order of the output grating 11. The remaining part is reflected by the output grating 11 to the rear side 6 of the first spectacle lens 3 (zero diffraction order) such that the corresponding light bundles L1-L3 and/or a part of the corresponding light bundles L1-L3, after a total internal reflection at the rear side 6, again strike the output grating 11 in a region which is spaced apart, in the y-direction, from the region of the first strike. Again, only a part of these light bundles L1-L3 or light bundle parts is output (first diffraction order). The remaining part is again reflected towards the rear side 6 (zero diffraction order) such that, after a total internal reflection at the rear side 6, the light beams of the light bundles L1-L3 or the light bundle parts again strike the output grating 11. The output grating 11 here is designed such that it carries out at most five outputs. With each output, a partial light bundle is thus generated, which partial light bundles are offset relative to each other in the y-direction. The output grating 11 here is designed such that the neighbouring partial light bundles of a light bundle L1-L3 in each case partially overlap each other in the plane of the exit pupil.

In the embodiment described here, the field of view provided to the user has a size of 12°×4° with a diameter of the eyebox of 7 mm, wherein a diameter of 3 mm is assumed for the pupil of the eye.

Figure 3A:
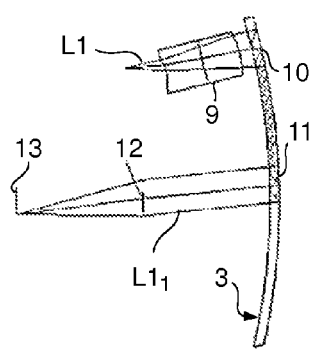
FIGS. 3a-3e are detail views according to FIG. 2 for different outputs of a first light bundle L1.
Figure 3B:
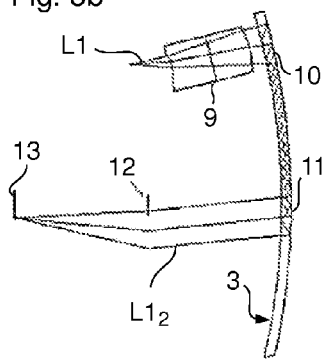
Figure 3C:
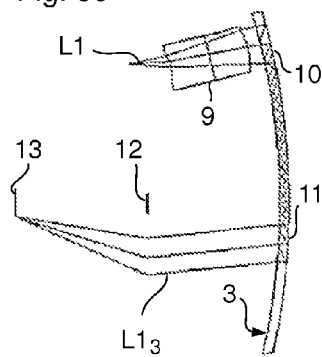
Figure 3D:
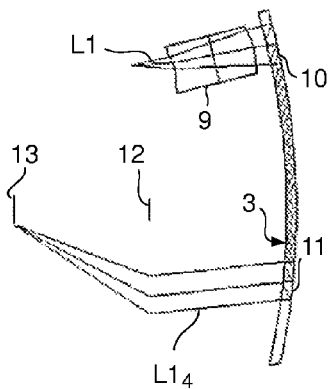
Figure 3E:
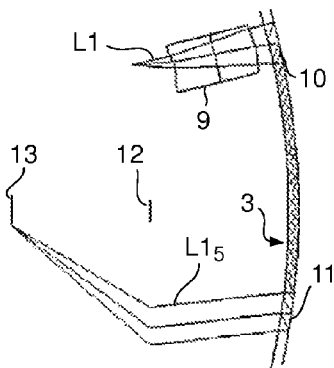

The individual outputs for the upper angle of field of +6° of the provided field of view are represented schematically in FIGS. 3a-3e. The upper angle of field corresponds, on the image generator 8, to a y-value of 2 mm, relative to the centre of the image generator 8. The first output effected at the first strike of the light bundle L1 on the output grating 11, and thus the first partial light bundle $L1_1$, is shown in FIG. 3a. Then the second to fifth outputs effected at the second to fifth strikes, and thus the second to fifth partial light bundles $L1_2$, $L1_3$, $L1_4$ and $L1_5$, are shown in FIGS. 3b-3e.

As can be seen from the representations in FIGS. 3a-3e, the principal part of the light perceptible to the user originates from the first output (partial light bundle $L1_1$). A small part originates from the second output (partial light bundle $L1_2$). The user would no longer perceive the light of the third to fifth outputs. The output grating 11 is therefore designed such that the light bundle is output completely, as far as possible, via the first and second outputs. As the third to fifth outputs would not strike the pupil of the eye 12, the output grating is not designed for this. The corresponding partial light bundles $L1_3$-$L1_5$ are e.g. not taken into account during the usual optimization calculation for determining the necessary grating parameters.

Figure 4:
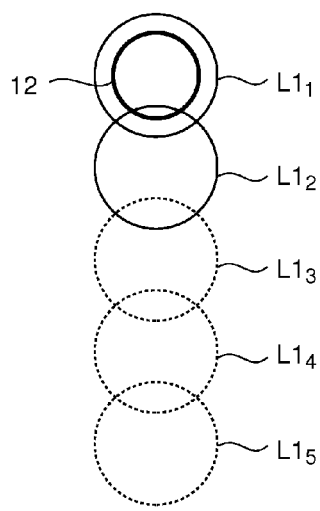
FIG. 4 is a top view of the output partial light bundles according to FIGS. 3a-3e in the plane of the pupil of the eye.
Figure 5A:
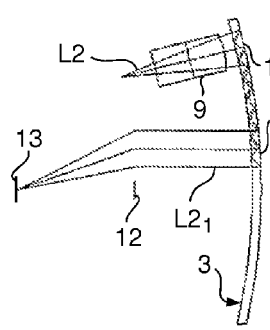
FIGS. 5a-5e are detail views according to FIG. 2 for different outputs of a second light bundle L2.
Figure 5B:
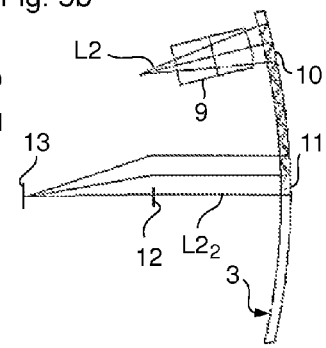
Figure 5C:
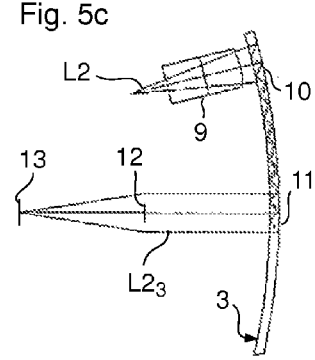
Figure 5D:
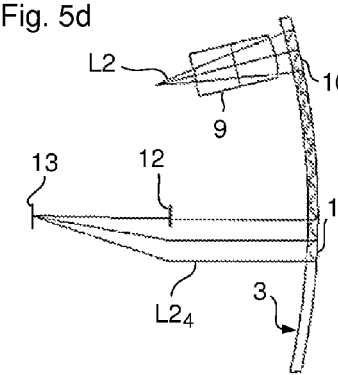
Figure 5E:
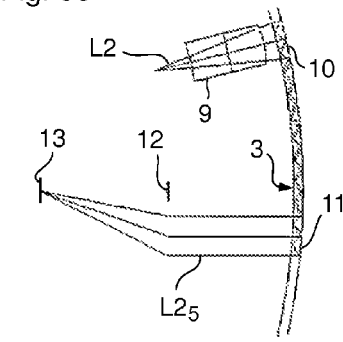

In FIG. 4 the partial light bundles $L1_1$-$L1_5$ for the five outputs are represented in the plane of the pupil of the eye 12, wherein the partial light bundles $L1_3$-$L1_5$ not actually generated and only described to illustrate the invention are drawn in as dotted lines.

Figure 6:
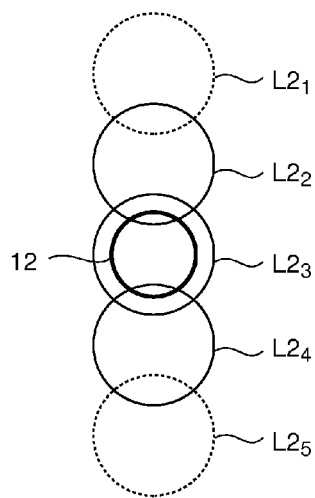
FIG. 6 is a top view of the output partial light bundles according to FIGS. 5a-5e in the plane of the pupil of the eye.
Figure 7A:
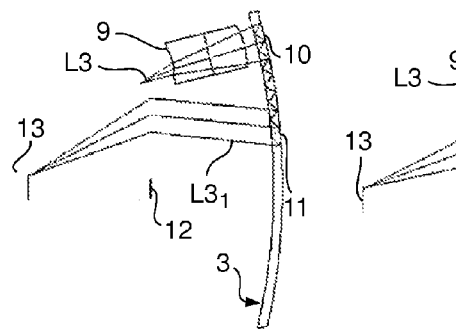
FIGS. 7a-7e are detail views according to FIGS. 3a-3e for different outputs of a third light bundle L3.
Figure 7B:
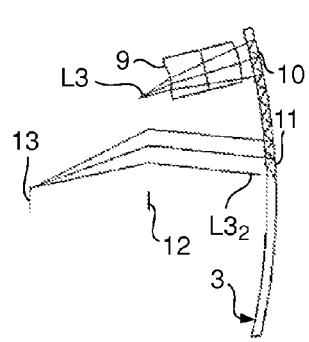
Figure 7C:
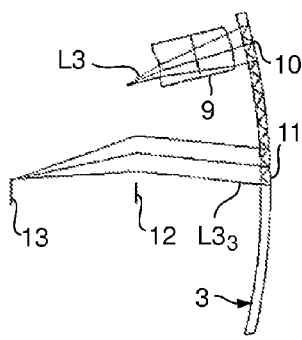
Figure 7D:
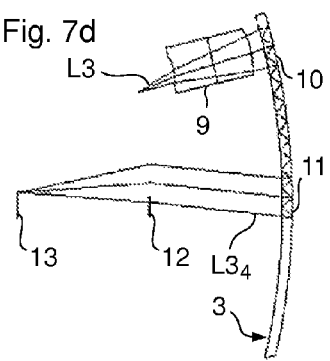
Figure 7E:
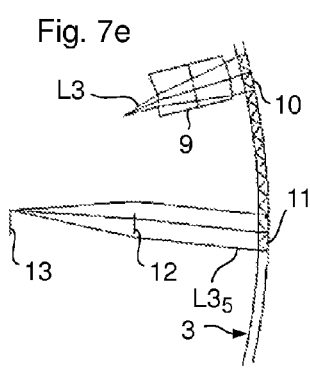

In FIGS. 5a-5e the five outputs are represented in the same way as in FIGS. 3a-3e for a middle angle of field, at which the angle of incidence onto the pupil of the eye 12 is perpendicular, which corresponds to a y value on the image generator of 0 mm and thus the centre of the image generator 8. In FIG. 6, in the same way as in FIG. 4, the position of the pupil of the eye 12 relative to the five partial light bundles $L2_1$, $L2_2$, $L2_3$, $L2_4$, $L2_5$ is represented. From the representations according to FIGS. 5a-5e and FIG. 6 it can be seen that the third output $L2_3$ supplies the most light to the observer. The second and fourth outputs $L2_2$ and $L2_4$ only contribute with a small part. The output grating 11 is therefore designed such that the output of the second light bundle L2 takes place at the second to fourth strike on the output grating 11.

Figure 8:
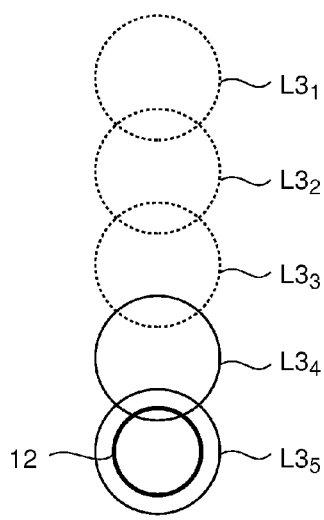
FIG. 8 is a top view of the output partial light bundles according to FIGS. 7a-7e in the plane of the pupil of the eye.

In FIGS. 7a-7e, in the same way as in FIGS. 3a-3e, the output for a lower angle of field of −6° on the pupil of the eye 12 is shown, which corresponds to a y value of −2 mm from the centre on the image generator 8. In FIG. 8, in turn, the position of the pupil of the eye 12 relative to the output partial light bundles $L3_1$, $L3_2$, $L3_3$, $L3_4$, $L3_5$ in top view according to FIG. 4 is shown. From FIGS. 7a-7e and 8 it can be seen that the principal part of the light originates from the fifth output $L3_5$. The fourth output $L3_4$ still contributes in small part. The output grating 11 is therefore designed such that the output of the third light bundle L3 takes place at the fourth and fifth strike.

The output grating 11 preferably has the optimal grating structure for each output, wherein the grating structure is preferably designed such that congruence is achieved for angles of field which are used by several neighbouring outputs. By this is meant that, within the limits of the resolution of the eye (<1 min), the same location on the retina 13 is struck. It can also be said that the same main beam angle exists for these neighbouring outputs for one angle of field. This can be achieved e.g. in that both the input grating 10 and the output grating 11 are designed imaging and are simultaneously optimized in conjunction with the specific shape of the first spectacle lens 3 such that, on the one hand, the demands of the modulation transfer function are met and, on the other hand, the described congruence is achieved. As a rule, at most three neighbouring outputs are provided for one angle of field, with the result that the congruence should thus be achieved for at most three neighbouring outputs, which can be realized well in practice.

If the input and output gratings 10 and 11 are designed imaging, imaging errors which are caused by the oblique incidence of the light bundles L1-L3 on the output grating 11, such as e.g. astigmatism and coma, can be compensated for. The oblique incidence on the output grating 11 is inevitably present as the light bundles L1-L3 are guided to the output grating 11 by total internal reflection at the front and rear side 5, 6 of the first spectacle lens.

The additional optical system 9 is designed such that the light bundles L1-L3 of the image generator strike the spectacle lens 3 as collimated light bundles. However, the additional optical system 9 can also be omitted. In this case, e.g., the input grating 10 can perform this collimation function.

The entrance pupil of the imaging optical system 14 is preferably positioned on or near the input grating 10, in order to achieve as small as possible an extent of the light spot of the light bundles or light beam bundles L1-L3 of all pixels of the image generator 8 on the input grating 10.

Furthermore, the two gratings 10, 11 preferably have approximately the same centre frequency, in order to minimize the spectral dependence. In addition, the two gratings 10, 11 can have a base dispersion of approximately the same size, whereby it is achieved on the one hand that the light is diffracted out of the spectacle lens 3 again in the direction of the eye. On the other hand, it is achieved that the colour-dependent diffraction angles approximately compensate for each other. All colours thereby propagate after leaving the spectacle lens 3 in each case, as far as possible, in the same direction, with the result that colours can be prevented from spreading out noticeably. To achieve the congruence, the distance of the individual neighbouring outputs of the respective light bundle L1-L3 to the required target image location can be inserted, as evaluation parameter, into the merit function of the normal optimization, i.e. for each target image location the different possible output branches on which light can reach the target image location are optimized in respect of image quality (modulation transfer function, spot size, etc.) as well as precision of superimposition. Degrees of freedom here are the position of the laser sources which are used in the illumination of the holograms to generate the two gratings 10, 11. Because of the relatively small spectacle lens thickness, the differences in the interference state of the wave which are brought about by the total reflection at the curved spectacle lens 3, 4 are relatively small for the neighbouring outputs, and can therefore be optimized very well.

Moreover, additional correction optical systems (e.g. lenses, mirrors, computer-generated holograms, etc.) can also be brought into the illumination structure of the holograms in order to achieve an additional improvement in performance.

In order to achieve as homogeneous as possible a field profile in terms of intensity, the diffraction efficiency of the output grating 11 can e.g. increase as the output increases. This can be achieved by a suitable course of the profile depth of the output grating 11. Thus, in the first output, only a relatively small part of the possible diffraction efficiency is used and the diffraction efficiency increases from the first to the last output.

Furthermore, it is possible to arrange a graduated filter (e.g. variable grey filter) close to the image generator 8. It is also possible to provide an adapted location-dependent radiation characteristic of the image generator in terms of intensity.

In order to achieve as good as possible a result for white light, the input grating 10 and the output grating 11 can in each case be formed as an overlay of e.g. three corresponding gratings, the centre frequencies of which are designed such that the bundles for the corresponding middle wavelengths are superimposed. Here, in each case, a pair of gratings can e.g. be adapted to red light, green light and blue light.

A further improvement of the efficiency properties can be achieved by designing input and output gratings 10, 11 as a reflective volume grating.

The output grating 11 is designed such that the user can perceive the output virtual image superimposed with the surroundings. Furthermore, output and input gratings 10, 11 are in each case formed on the front side 5 as reflective gratings.

In the display device according to the invention the light bundles L1-L3 thus strike the output grating at most n times depending on the position of the associated pixel of the image generator, wherein n is an integer greater than or equal to 3. In the embodiment described here n is equal to 5. In addition, each light bundle L1-L3 is output depending on the position of the associated pixel at 1 to m successive strikes on the output grating 11, wherein m is an integer greater than or equal to 1 and is smaller than n. In the embodiment described here m is 2 for the first light bundle L1, 3 for the second light bundle L2 and 2 for the third light bundle L3. The outputting of the respective light bundle L1-L3 begins, at the latest, at the $(n-m+1)^{th}$ strike on the output grating. In the case of the first light bundle L1 the outputting begins at the first strike, in the case of the second light bundle L2 the outputting begins at the second strike and in the case of the third light bundle L3 the outputting begins at the fourth strike on the output grating 11.

In addition, in the described embodiment the case exists that two to three outputs or diffraction outputs are needed for the desired output of the corresponding light bundles. However, it is also possible for only one diffraction output to be needed for at least one of the light bundles L1-L3.

As the input grating 10 has to diffract the light bundles L1-L3 so strongly that the light bundles are then guided by a total internal reflection in the spectacle lens 3, a grating frequency of approx. 1700-2300 lines/mm is needed. In the case of green light e.g. a grating frequency of approx. 2000 lines/mm is needed, in the case of red light e.g. a grating frequency of approx. 1700/mm and in the case of blue light e.g. a grating frequency of approx. 2300/mm. The same then applies to the output grating 11, which has to output, towards the eye of the user, the light bundles L1-L3 directed onto themselves by means of total reflection. It is therefore preferred to produce the input and output gratings 10, 11 by holographic illumination with planar and/or spherical waves. The positions of the illumination wavelengths are the decisive correction parameters for correcting the modulation transfer function and the congruence. For improvement, in particular deformed wavefronts can also be used. During the illumination of the gratings, special optical systems or also computer-generated holograms can be introduced into the illumination beam path to further improve the overall performance.

The described five outputs are only to be understood by way of example. Naturally, fewer (but at least three) or more outputs can also be provided. With more outputs, a larger field of view can be provided.

In the embodiment described up to now, it was assumed that the several outputs are only carried out in one direction (y direction). Naturally, it is also possible to carry out several outputs in the same way in a second direction (e.g. the x direction here), in order to enlarge not only the horizontal field of view (y direction), but e.g. also the vertical field of view (x direction).

In addition, up to now, the display device according to the invention has only been described for one spectacle lens (the left-hand spectacle lens 3). The display device according to the invention can be formed such that additional information (image of the image generator 8) is only generated via one spectacle lens (for example the left-hand spectacle lens) and reflected to the user in his field of vision. Naturally, it is also possible to form both spectacle lenses such that additional information can be reflected to the user for both eyes. In this case, the information can also be reflected such that a three-dimensional image impression of the reflected information forms for the user.

The spectacle lenses 3, 4 can be spectacle lenses for correcting defective vision. However, they need not be such spectacle lenses, they can also have no optical correction effect in respect of a sight defect.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A Display device, comprising:
   an image generator including several pixels, from which light bundles are emitted for generating an image;
   a control unit for controlling the image generator; and
   an imaging optical system, including a light guiding element with a front side and a rear side, the light guiding element including an input grating formed on one of the front and rear sides, and an output grating formed on the opposing one of the front and rear sides,
   wherein the light bundles are input into the light guiding element by means of diffraction at the input grating, guided in the light guiding element by means of total internal reflection up to the output grating and output by diffraction at the output grating such that a user perceives the generated image,
   wherein at least one of the front side and the rear side is curved, and the imaging optical system is configured such that the light bundles strike the output grating at most n times depending on the position of the associated pixel, wherein n is an integer greater than or equal to three, and
   wherein the light bundles are output depending on the position of the associated pixel at 1 to m successive strikes on the output grating, wherein m is an integer greater than or equal to one and is smaller than n and the outputting begins, at the latest, at the $(n-m+1)^{th}$ strike.

2. A display device according to claim 1, wherein at least one of the input and output gratings are formed as an imaging grating.

3. A display device according to claim 2, wherein the output grating is configured such that a diffraction efficiency of the output grating for a light bundle increases from the first to the $m^{th}$ output.

4. A display device according to claim 2, wherein at least one of the input and output gratings are formed as a reflective volume grating.

5. A display device according to claim 4, wherein the output grating is configured such that a diffraction efficiency of the output grating for a light bundle increases from the first to the $m^{th}$ output.

6. A display device according to claim 1, wherein at least one of the input and output gratings are formed as a reflective volume grating.

7. A display device according to claim 2, wherein the output grating is configured such that a diffraction efficiency of the output grating for a light bundle increases from the first to the $m^{th}$ output.

8. A display device according to claim 1, wherein at least one of the input and output gratings are formed on the front side of the light guiding element.

9. A display device according to claim 8, wherein the output grating is configured such that a diffraction efficiency of the output grating for a light bundle increases from the first to the $m^{th}$ output.

10. A display device according to claim 1, wherein the output grating is configured such that a diffraction efficiency of the output grating for a light bundle increases from the first to the $m^{th}$ output.

11. A display device according to claim 1, wherein a graduated filter is disposed between the spectacle lens and the image generator such that a homogeneous intensity in the image is perceived by the observer.

12. A display device according to claim 1, wherein the image generator has a location-dependent variation of the emitted light intensity, in order to achieve a homogeneous intensity in the image that is perceived by the user.

13. A display device according to claim 1, wherein several outputs of a light bundle of an eyebox of the imaging optical system partially overlap each other.

14. A display device according to claim 1, wherein the input and output gratings are each a superimposition of several individual gratings which are designed for different center frequencies, wherein the center frequencies of the individual gratings for the input and output gratings each coincide in pairs.

15. A display device according to claim 1, wherein the display device includes a holder which fits on the head of the user and to which the image generator and the light guiding element are attached.

16. A display device according to claim 1, wherein the light guiding element and the output grating are configured such that the user perceives the generated image superimposed with the surroundings.

* * * * *